United States Patent
Lee

(10) Patent No.: US 9,694,760 B2
(45) Date of Patent: Jul. 4, 2017

(54) SYSTEM AND METHOD FOR PROJECTING IMAGES OF AN ELECTRONIC DEVICE ON A VEHICLE WINDOW

(71) Applicant: HON HAI PRECISION INDUSTRY CO., LTD., New Taipei (TW)

(72) Inventor: Chia-Yen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 14/687,591

(22) Filed: Apr. 15, 2015

(65) Prior Publication Data

US 2016/0109939 A1    Apr. 21, 2016

(30) Foreign Application Priority Data

Oct. 15, 2014   (TW) .............................. 103135661 A

(51) Int. Cl.
*G02B 27/01*       (2006.01)
*B60R 11/02*       (2006.01)
(Continued)

(52) U.S. Cl.
CPC .......... *B60R 11/0258* (2013.01); *B60R 11/02* (2013.01); *B60R 11/0241* (2013.01); *B60R 11/0252* (2013.01); *B60R 11/04* (2013.01); *G02B 27/0103* (2013.01); *G02B 27/0149* (2013.01); *G06F 3/011* (2013.01);
(Continued)

(58) Field of Classification Search
CPC . B60R 11/02; B60R 11/0241; B60R 11/0252; B60R 11/0258; B60R 11/04; B60R 2300/205; G02B 27/0103; G02B 27/0149; G02B 2027/0138;
(Continued)

(56) References Cited

U.S. PATENT DOCUMENTS 6,757,085 B1 *   6/2004   Halldorsson .............. B60R 1/00
                                                    345/9
2003/0043280 A1 *   3/2003   Nagao .................. B60Q 1/2665
                                                    348/216.1
(Continued)

FOREIGN PATENT DOCUMENTS

DE      102004033480 A1     2/2006
DE      102008000192 A1     9/2008
WO        2006103196 A1    10/2006

*Primary Examiner* — Sultan Chowdhury
*Assistant Examiner* — Magda Cruz
(74) *Attorney, Agent, or Firm* — Steven Reiss

(57) ABSTRACT

A system for projecting an image onto a window of a vehicle is supplied. The system includes a support, a camera, a projector, and a projective film. The support is mounted in the vehicle for holding an electronic device. The camera is mounted to relative to the location for capturing an image of the display when the electronic device is mounted on the support. The projector is in signal communication with the camera. The projector projects an image from the camera onto the window. The projective film mounted on the vehicle window configured to act as a projection screen for the projector. When the electronic device is mounted on the support displays an electronic image, the camera captures the image and sends the image to the projector, and the projector projects the image onto the projective film on the window. The discourse also provides a method using the system.

12 Claims, 3 Drawing Sheets

(51) Int. Cl.
*B60R 11/04* (2006.01)
*G06F 3/01* (2006.01)

(52) U.S. Cl.
CPC .. *B60R 2300/205* (2013.01); *G02B 2027/014* (2013.01); *G02B 2027/0138* (2013.01); *G02B 2027/0161* (2013.01); *G02B 2027/0194* (2013.01)

(58) Field of Classification Search
CPC ...... G02B 2027/014; G02B 2027/0161; G02B 2027/0194; G06F 3/011
See application file for complete search history.

(56) References Cited

U.S. PATENT DOCUMENTS

| | | |
|---|---|---|
| 2008/0231608 A1 | 9/2008 | Nagata |
| 2010/0220053 A1 | 9/2010 | Ishii |
| 2011/0301813 A1* | 12/2011 | Sun ..................... B62D 15/029 701/41 |

* cited by examiner

SYSTEM AND METHOD FOR PROJECTING IMAGES OF AN ELECTRONIC DEVICE ON A VEHICLE WINDOW

FIELD

The subject matter herein generally relates to a system and a method for projecting images of an electronic device on a vehicle window.

BACKGROUND

Smart electronic devices are widely used in vehicles, such as a GPS navigator or a mobile phone. A driver needs to hold the electronic device in one hand when he or she looks at the electronic device during driving. A bracket may be mounted in a vehicle for holding the electronic device. However, the driver paying attention to a display of the electronic device without observing traffic conditions may cause a traffic accident.

BRIEF DESCRIPTION OF THE DRAWINGS

Implementations of the present technology will now be described, by way of example only, with reference to the mounted figures.

DETAILED DESCRIPTION

Figure 1:
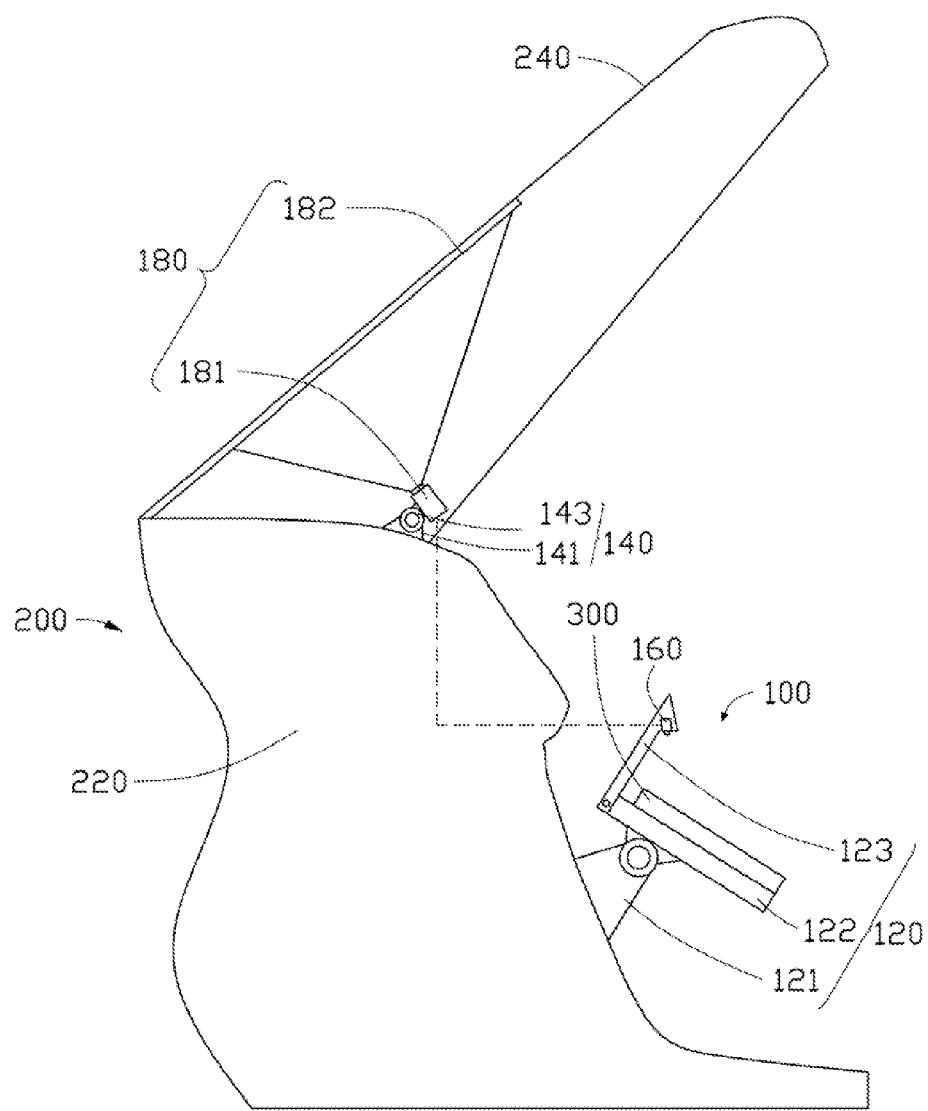
FIG. 1 is a diagrammatic view of a system for projecting images of an electronic device on a vehicle window, the system including a camera and a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

A system for projecting an image onto a window of a vehicle is supplied. The system can include a support, a camera, a projector, and a projective film. The support can be mounted in the vehicle and configured to hold an electronic device with a display in a location. The camera can be mounted to relative to the location and configured to capture an image of the display when the electronic device is mounted on the support. The projector can be in signal communication with the camera. The projector can project an image from the camera onto the window. The projective film can be mounted on the vehicle window configured to act as a projection screen for the projector. When the electronic device is mounted on the support and displays an electronic image, the camera captures the image and sends the image to the projector, and the projector projects the image onto the projective film on the window. The image of the electronic device is capable of being viewed on the window without looking directly at the electronic device.

A method for projecting images of an electronic device on a vehicle window is also disclosed. The method can be described as following: a system is supplied, the system including a support, a camera, a projector, and a projective film, the support is configured to be positioned in the vehicle for holding the electronic device, the projective film is mounted on a window of the vehicle; the electronic device is position on the support; displaying images of the electronic device is captured via the camera and the camera transmits the images to the projector; and the displaying images is displayed on the projective film by the projector.

FIG. 1 illustrates a system 100 for an electronic device 300 applied in a vehicle 200. The vehicle 200 can include a center console 220 and a window 240 coupled to the center console 220. The vehicle 200 can also include other functional mechanisms and modules, but not described here for simplify. In the illustrated embodiment, the window 240 can be a front windshield.

The system 100 can include a support 120, a holder 123, a bracket 140, a camera 160, and a projecting device 180.

The support 120 can be positioned on a side portion of the center console 220 and positioned adjacent to a driver's seat (not shown), so that a driver can conveniently operate the electronic device. The support 120 can include a base 121 and a fixing base 122. The base 121 can be mounted on the side portion of the center console 220 and positioned adjacent to the driver's seat. The base 121 can be positioned on the side portion of the center console 220 via kinds of methods, for example, the base 121 can be sucked on the side portion of the center console 220. The base 121 can also be integrally formed on the side portion of the center console 220.

The fixing base 122 can be coupled with the base 121 away from the center console 220. The fixing base 122 can be used for holding and supporting the electronic device 300. The holder 123 can be positioned on the fixing base 122 for holding and supporting the camera 160. In the illustrated embodiment, the fixing base 122 can be rotatably coupled to the base 121, so that a position of the fixing base 122 on the base 121 can be adjusted for a convenient operation of the electronic device 300; the holder 123 can be rotatably positioned on one end of the fixing base 122, so that a position of the holder 123 relative to the base 121 can be adjusted for a convenient operation of the camera 160.

The bracket 140 can be positioned on a top portion of the center console 220 and positioned adjacent to the window 240. The bracket 140 can be used for holding and supporting the projecting device 180. The bracket 140 can include a mounting portion 141 and a rotation portion 143. The mounting portion 141 can be fixedly mounted on the top portion of the center console 220 and positioned adjacent to the window 240. The rotation portion 143 can be rotatably coupled to the mounting portion 141 for holding and supporting the projecting device 180. In the illustrated embodiment, the bracket 140 can be rotatably positioned on the top portion of the center console 220.

Figure 2:
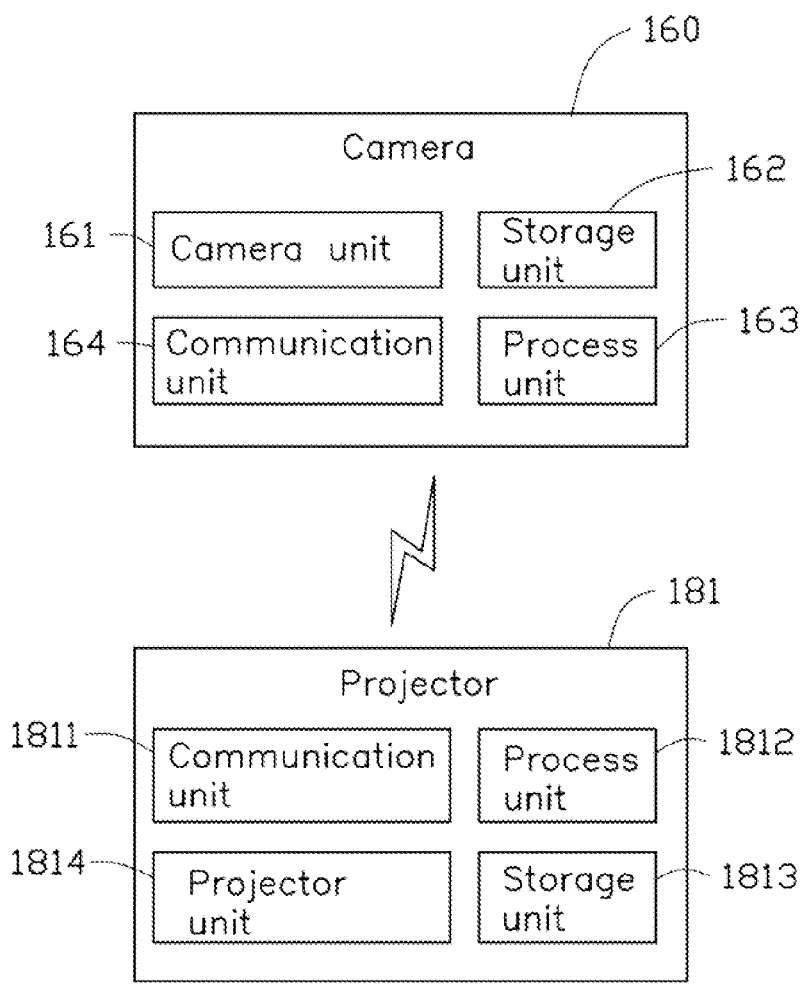
FIG. 2 is a block diagram for the camera and the projector.

The camera 160 can be hold and supported by the holder 123. FIG. 2 illustrates functional modules for the camera 160. The camera 160 can include a camera unit 161, a storage unit 162, a process unit 163, and a communication unit 164. The camera unit 161 can capture images displayed on the electronic device 300. The storage unit 162 can store the displaying images. The process unit 163 can be control the camera unit 161, the storage unit 162, and the communication unit 164. The process unit 163 also can transform the displaying images to digital signals. The communication unit 164 transmits the digital signals for the displaying images from the process unit 163 to the projecting device 180.

The projecting device 180 can be positioned on the bracket 140. The projecting device 180 can receive the digital signals from the camera 160. The projecting device 180 can include a projector 181 hold by the bracket 140 and a projective film 182 mounted on the window 240. FIG. 2 illustrates a block diagram for the projector 181. The projector 181 can be hold by the rotation portion 143. The projector 181 can be in signal communicating with the camera 160. The projector 181 can be coupled with the camera 160 via wires for transmitting and receiving digital. In others embodiments, the projector 181 can be wirelessly connected with the camera 160. The projector 181 can include a communication unit 1811, a process unit 1812, a storage unit 1813, and a project unit 1814. The communication unit 1811 of the projector 181 can receive the image data transmitting signal from the camera 160, the process unit 1812 can transform the digital signals to be image data, the storage unit 1813 of the projector 181 can store the image data, and the project unit 1814 can project the images on the projective film 182. Then, the displaying images of the electronic device 300 can be displayed on the projective film 182. The projective film 182 can be transparent, so the driver can observe traffic conditions via the projective film 182 without any difficulty. In the illustrated embodiment, the projective film 182 can be a holographic projective film.

In other embodiments, the electronic device 300 can be coupled with an audio device of the vehicle 200 for improving an audio effect.

In other embodiments, the projective film 182 can be mounted on a side window for other passengers of the vehicle to view.

In other embodiments, the bracket 140 can be positioned on other structures of the vehicle 200, such as an inner roof of the vehicle 200; and the support 120, the holder 123 can be positioned on other structures of the vehicle 200, such as a top portion of the center console 220.

In other embodiments, the bracket 140 and the holder 123 can be omitted, and the camera 160 and the projector 181 can be mounted in the vehicle 200 via structures of themselves.

In other embodiments, the holder 123 can be directly positioned on one portion of the vehicle 200, and the camera 160 hold by the holder 123 can capture the displaying images of the electronic device 300.

In use, the electronic device 300 can be positioned on the fixing base 122. The camera 160 and the projector 181 can be started. The displaying image of the electronic device 300 can be projected on the projective film in real time. The driver can adjust an angle between the fixing base 122 and the base 121, an angle between the fixing base 122 and the holder 123, an angle between the rotation portion 143 and the mounting portion 141 for adjusting positions of the electronic device 300, the camera 160, and the projector 181, according to himself or herself desire.

Figure 3:
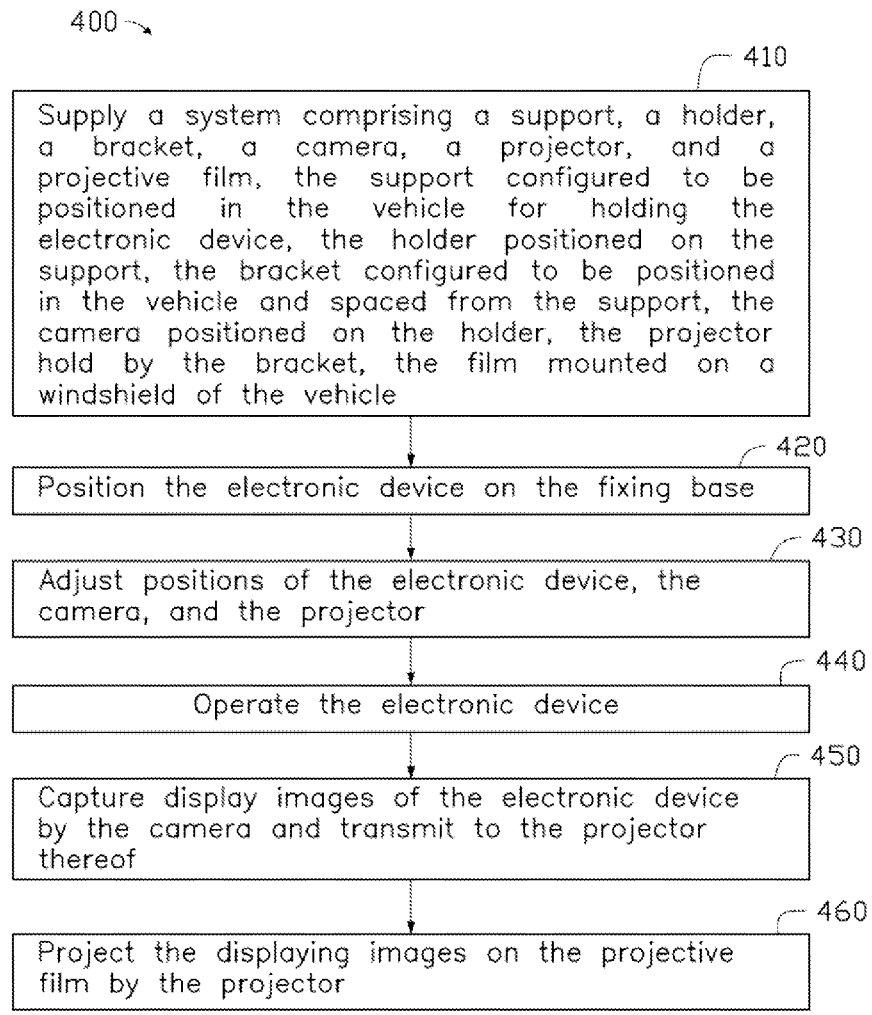
FIG. 3 is a flowchart of a method for using the system of FIG. 1.

Referring to FIG. 3, a flowchart is presented in accordance with an example embodiment which is being thus illustrated. The example method is provided by way of example, as there are a variety of ways to carry out the method. The method described below can be carried out using the configurations illustrated in FIGS. 1 and 2, for example, and various elements of these figures are referenced in explaining example method. The method can be carried out using a system for using an electronic device applied in the vehicle.

Each block shown in FIG. 3 represents one or more processes, methods or subroutines, carried out in the exemplary method. Additionally, the illustrated order of blocks is by example only and the order of the blocks can change according to the present disclosure. The exemplary method 400 can begin at block 410.

At block 410, a system for an electronic device applied in a vehicle is supplied. The system can include a support, a bracket, a camera, and a projecting device. The support can be positioned on a first portion of the vehicle for holding the electronic device. The bracket can be positioned on a second portion of the vehicle. The support can include a base, a fixing base, and a holder. The base can be mounted on the first portion. The fixing base can be rotatably coupled with the base away from the first portion. The holder can be rotatably positioned on the fixing base for holding and supporting the camera. The bracket can include a mounting portion and a rotation portion. The mounting portion can be fixedly mounted on the second portion of the vehicle. The rotation portion can be rotatably coupled to the mounting portion for holding and supporting the projecting device. In the illustrated embodiment, the first portion can be a side portion of a center console of the vehicle adjacent to a driver's seat, and the second portion can be a top portion of the center console adjacent to the window.

The camera can be positioned on the support. The projecting device can include a projector and a projective film mounted on a window of the vehicle. The camera can be hold by the holder. The projector can be supported by the bracket. The camera can include a camera unit, a storage unit, a process unit, and a communication unit. The camera unit can be used for capturing displaying images of the electronic device. The storage unit of the camera can be used for storing the displaying images. The process unit of the camera can be used for controlling the camera unit of the camera, the storage unit of the camera, and the communication unit of the camera. The process unit of the camera can also transform the displaying images to be digital signals. The communication unit of the camera is configured to transmit the digital signals to the projecting device.

The projecting device can be positioned on the bracket. The projecting device can receive the digital signals from the camera. The projector can be coupled with the camera via wires for transmitting digital. In others embodiments, the projector can be wirelessly connected with the camera. The projector can include a communication unit, a process unit, a storage unit, and a project unit. The communication unit of the projector can be used for receiving the image data from the camera, the process unit can transform the digital signals to be image data, the storage unit of the projector can store the image data, and the project unit can project the images on the projective film. The projective film can be mounted on a windshield or window of the vehicle.

At block 420, the electronic device is positioned on the fixing base.

At block 430, positions of the electronic device, the camera, and the projector are adjusted. In detail, an angle between the fixing base and the base, an angle between the fixing base and the holder, an angle between the rotation portion and the mounting portion can be adjusted for adjusting positions of the electronic device, the camera, and the projector, according to himself or herself desire.

At block 440, the electronic device is operated to display images.

At block 450, the camera captures displaying images of the electronic device and transmits to the projector thereof. In detail, the camera unit of the camera can capture the displaying images of the electronic device and transmit to the storage unit of the camera, the process unit of the camera can transform the displaying images to be digital signals, and the communication unit of the camera can transmit the digital signals to the projector.

At block 460, the displaying images of the electronic device are projected on the projective film. In detail, the communication unit of the projector can receive the digital signals from the camera, the process unit of the projector can transform the digital signals to be images, and the storage unit can store the images, and the project unit can project the images on the projective film.

In other embodiments, the block 430 of adjusting positions of the electronic device, the camera, and the projector can be omitted, when the fixing base, the base, the holder are fixed without any motion.

In other embodiments, the block 440 of operating the electronic device can be omitted when the electronic device have been operated to display images before positioning the fixing base.

The displaying images of the electronic device can be directly projected on the window in real time. The driver can observe the external traffic condition when he or she views the displaying images of the electronic device.

The embodiments shown and described above are only examples. Many details are often found in the art such as the other features of a system and method for projecting images of an electronic device on a vehicle window. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system for projecting an image onto a window of a vehicle, comprising:
   a support configured to be mounted in the vehicle and configured to hold an electronic device with a display in a location;
   a camera mounted to relative to the location and configured to capture an image of the display when the electronic device is mounted on the support;
   a projector in signal communication with the camera and configured to project an image from the camera onto the window;
   a projective film mounted on the vehicle window configured to act as a projection screen for the projector,
   wherein when the electronic device is mounted on the support and displays an electronic image, the camera captures the image and sends the image to the projector, and the projector projects the image onto the projective film on the window;
   wherein the image of the electronic device are capable of being viewed on the window without looking directly at the electronic device; and
   wherein the support comprises a base and a fixing base, the base is configured to be mounted on a side portion of a center console of the vehicle, the fixing base is coupled with the base for holding the electronic device, and the system further comprises a holder positioned on the fixing base, the camera is positioned on the holder.

2. The system of claim 1, wherein the fixing base is rotatably positioned on the base, and the holder is rotatably positioned at one end of the fixing base.

3. The system of claim 1, wherein the system further comprises a bracket, the bracket comprises a mounting portion and a rotation portion rotatably coupled to the mounting portion, the mounting portion is configured to be positioned in the vehicle and spaced from the support, and the projector is positioned on the rotation portion.

4. The system of claim 1, wherein the camera comprises a camera unit, a storage unit, a process unit, and a communication unit, the camera unit is configured to capture the displaying images of the electronic device, the storage unit of the camera is configured to store the displaying images, the process unit of the camera is configured to control the camera unit, the storage unit of the camera, and the communication unit of the camera, the process unit of the camera is configured to transform the displaying images to be digital signals, and the communication unit of the camera is configured to transmit the digital signals to the projector.

5. The system of claim 4, wherein the projector comprises a communication unit, a process unit, a storage unit, and a project unit, the communication unit of the projector is configured to receive the digital signals from the camera, the process unit of the projector is configured to transform the digital signals to be images, the storage unit of the projector is configured to store the images, and the project unit is configured to project the images on the projective film.

6. The system of claim 1, wherein the projective film is a holographic projective film.

7. A method for projecting images of an electronic device on a window of a vehicle, comprising:
   supply a system comprising a support, a camera, a projector, and a projective film, the support configured to be positioned in the vehicle for holding the electronic device, the projective film mounted on the window of the vehicle, wherein the support comprises a base and a fixing base, the base is configured to be mounted on a side portion of a center console of the vehicle, the fixing base is coupled with the base for holding the electronic device;
   position the electronic device on the support;
   capture displaying images of the electronic device via the camera and transmit the images to the projector; and
   project the displaying images on the projective film by the projector.

8. The method of claim 7, wherein the system further comprises a holder and a bracket, the holder is positioned on the fixing base, the camera is positioned on the holder, the bracket comprises a mounting portion configured to be positioned on a top portion of a center console of the vehicle and a rotation portion rotatably coupled to the mounting portion, and the projector is positioned on the rotation portion.

9. The method of claim 8,
wherein the method further comprises a step between the step of camera capturing the displaying image and the next step of positioning the electronic device:
adjust positions of the camera, the electronic device, and the projector via adjusting a first angle between the fixing base and the base, a second angle between the fixing base and the holder, and a third angle between the rotation portion and the mounting portion.

10. The method of claim 7, wherein the camera comprises a camera unit, a storage unit, a process unit, and a communication unit, the camera unit is configured to capture the displaying images of the electronic device, the storage unit of the camera is configured to store the displaying images, the process unit of the camera is configured to control the camera unit and the storage unit of the camera, the process unit of the camera is configured to transform the displaying images to be digital signals, and the communication unit of the camera is configured to transmit the digital signals to the projector.

11. The method of claim 7, wherein the projector comprises a communication unit, a process unit, a storage unit, and a project unit, the communication unit of the projector is configured to receive the digital signals from the camera, the process unit of the projector is configured to transform the digital signals to be images, the storage unit of the projector is configured to store the images, and the project unit is configured to project the images on the projective film.

12. The method of claim 7, wherein the projective film is a holographic projective film.

* * * * *